(12) United States Patent
Brickell et al.

(10) Patent No.: US 9,858,572 B2
(45) Date of Patent: Jan. 2, 2018

(54) DYNAMIC ALTERATION OF TRACK DATA

(71) Applicant: Google Inc., Mountain View, CA (US)

(72) Inventors: Justin Lee Brickell, San Francisco, CA (US); Swaminathan Mahadevan, Sunnyvale, CA (US); Harry Lee Butler, IV, New York, NY (US); Bobby Wieler, New York, NY (US); Ignacio Carlos Blanco, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 578 days.

(21) Appl. No.: 14/174,828

(22) Filed: Feb. 6, 2014

(65) Prior Publication Data

US 2015/0220925 A1 Aug. 6, 2015

(51) Int. Cl.
*G06K 5/00* (2006.01)
*G06Q 20/40* (2012.01)
*G06Q 20/36* (2012.01)

(52) U.S. Cl.
CPC ......... *G06Q 20/4014* (2013.01); *G06Q 20/36* (2013.01)

(58) Field of Classification Search
USPC ........................................ 235/379, 492, 380
See application file for complete search history.

(56) References Cited

U.S. PATENT DOCUMENTS 5,221,838 A 6/1993 Gutman et al.
5,537,476 A 7/1996 Coteus et al.
(Continued)

FOREIGN PATENT DOCUMENTS

EP 1 153 375 B1 1/2003
JP 2001-320764 A 11/2001
(Continued)

OTHER PUBLICATIONS

Park, H., International Search Report and Written Opinion issued in International Application No. PCT/US2015/012784, pp. 1-18, dated Apr. 27, 2015.
(Continued)

*Primary Examiner* — Daniel Hess
(74) *Attorney, Agent, or Firm* — Johnson, Marcou & Isaacs, LLC (57) ABSTRACT

Using discretionary data fields to secure transactions comprises a payment system employing a server configured to associate a payment account of a user with a user computing device, the payment account comprising a payment account identifier that identifies the payment account, and establish a authentication challenge and an corresponding challenge response. The payment system receives a first payment authorization request originating from a merchant computing system comprising the payment account identifier, data associated with the payment account identifier, and a request to fund a transaction using the payment account, wherein the data associated with the payment account identifier comprises a challenge response provided by the user computing device located in a discretionary data field. The payment system compares the provided challenge response with the corresponding challenge response, and approves the transaction based on whether the provided challenge response and the corresponding challenge response match.

18 Claims, 5 Drawing Sheets

(56) References Cited

U.S. PATENT DOCUMENTS

| | | |
|---|---|---|
| 5,614,920 A | 3/1997 | Coteus et al. |
| 5,619,219 A | 4/1997 | Coteus et al. |
| 5,881,287 A | 3/1999 | Mast |
| 5,883,810 A | 3/1999 | Franklin et al. |
| 5,884,271 A | 3/1999 | Pitroda |
| 6,000,832 A | 12/1999 | Franklin et al. |
| 6,535,929 B1 | 3/2003 | Provino et al. |
| 6,786,400 B1 | 9/2004 | Bucci |
| 6,879,965 B2 | 4/2005 | Fung et al. |
| 6,961,941 B1 | 11/2005 | Nelson et al. |
| 7,065,651 B2 | 6/2006 | Evans |
| 7,073,070 B2 | 7/2006 | Girard |
| 7,177,848 B2 | 2/2007 | Hogan et al. |
| 7,181,744 B2 | 2/2007 | Shultz et al. |
| 7,197,648 B2 | 3/2007 | Evans |
| 7,203,310 B2 | 4/2007 | England et al. |
| 7,206,940 B2 | 4/2007 | Evans et al. |
| 7,257,811 B2 | 8/2007 | Hunt et al. |
| 7,272,726 B2 | 9/2007 | Evans et al. |
| 7,284,135 B2 | 10/2007 | Evans et al. |
| 7,293,178 B2 | 11/2007 | Evans et al. |
| 7,299,365 B2 | 11/2007 | Evans |
| 7,302,586 B2 | 11/2007 | Evans |
| 7,337,328 B2 | 2/2008 | Evans |
| 7,337,329 B2 | 2/2008 | Evans |
| 7,346,909 B1 | 3/2008 | Eldar et al. |
| 7,363,265 B2 | 4/2008 | Horgan |
| 7,380,130 B2 | 5/2008 | England et al. |
| 7,401,731 B1 | 7/2008 | Pletz et al. |
| 7,421,533 B2 | 9/2008 | Zimmer et al. |
| 7,490,324 B2 | 2/2009 | Shultz et al. |
| 7,600,267 B2 | 10/2009 | Bauchot et al. |
| 7,619,622 B2 | 11/2009 | de Souza et al. |
| 7,620,984 B2 | 11/2009 | Kallahalla et al. |
| 7,631,184 B2 | 12/2009 | Ryan |
| 7,634,664 B2 | 12/2009 | Ibrahim et al. |
| 7,650,314 B1 | 1/2010 | Saunders |
| 7,657,759 B2 | 2/2010 | Rubin et al. |
| 7,688,719 B2 | 3/2010 | Rehm |
| 7,689,926 B2 | 3/2010 | de Souza et al. |
| 7,702,578 B2 | 4/2010 | Fung et al. |
| 7,716,377 B2 | 5/2010 | Harris et al. |
| 7,739,417 B2 | 6/2010 | Liu et al. |
| 7,752,436 B2 | 7/2010 | Grobman et al. |
| 7,766,244 B1 | 8/2010 | Field et al. |
| 7,768,522 B2 | 8/2010 | Stauffer et al. |
| 7,788,713 B2 | 8/2010 | Grobman et al. |
| 7,797,748 B2 | 9/2010 | Zheng et al. |
| 7,801,814 B2 | 9/2010 | Cataline et al. |
| 7,802,000 B1 | 9/2010 | Huang et al. |
| 7,809,652 B2 | 10/2010 | Dixon et al. |
| 7,865,414 B2 | 1/2011 | Fung et al. |
| 7,870,153 B2 | 1/2011 | Croft et al. |
| 7,890,422 B1 | 2/2011 | Hirka et al. |
| 7,900,005 B2 | 3/2011 | Kotsovinos et al. |
| 7,922,083 B2 | 4/2011 | Harrison et al. |
| 7,941,539 B2 | 5/2011 | Tripathi et al. |
| 7,949,677 B2 | 5/2011 | Croft et al. |
| 7,954,150 B2 | 5/2011 | Croft et al. |
| 7,996,288 B1 | 8/2011 | Stolfo |
| 8,010,667 B2 | 8/2011 | Zhang et al. |
| 8,010,679 B2 | 8/2011 | Low et al. |
| 8,051,180 B2 | 11/2011 | Mazzaferri et al. |
| 8,060,876 B2 | 11/2011 | Smith et al. |
| 8,069,121 B2 | 11/2011 | Goodrich et al. |
| 8,108,641 B2 | 1/2012 | Goss et al. |
| 8,140,418 B1 | 3/2012 | Casey et al. |
| 8,249,257 B2 | 8/2012 | Brutch et al. |
| 8,249,961 B1 | 8/2012 | Hopkins |
| 8,259,948 B2 | 9/2012 | Smith et al. |
| 8,326,758 B2 | 12/2012 | Bennett |
| 8,341,732 B2 | 12/2012 | Croft et al. |
| 8,392,328 B2 | 3/2013 | Shah et al. |
| 8,401,904 B1 | 3/2013 | Simakov et al. |
| 8,566,168 B1 | 10/2013 | Bierbaum et al. |
| 2001/0044785 A1 | 11/2001 | Stolfo et al. |
| 2002/0029342 A1 | 3/2002 | Keech |
| 2002/0152156 A1 | 10/2002 | Tyson-Quah |
| 2003/0061157 A1 | 3/2003 | Hirka et al. |
| 2003/0121969 A1* | 7/2003 | Wankmueller ......... G06K 19/10 235/379 |
| 2003/0126094 A1 | 7/2003 | Fisher et al. |
| 2003/0140241 A1 | 7/2003 | England et al. |
| 2003/0200435 A1 | 10/2003 | England et al. |
| 2004/0024703 A1 | 2/2004 | Roskind |
| 2004/0049452 A1 | 3/2004 | Blagg |
| 2004/0148255 A1 | 7/2004 | Beck et al. |
| 2004/0225509 A1 | 11/2004 | Andre |
| 2004/0236646 A1 | 11/2004 | Wu |
| 2004/0260646 A1 | 12/2004 | Berardi et al. |
| 2005/0039180 A1 | 2/2005 | Fultheim et al. |
| 2005/0102671 A1 | 5/2005 | Baumberger |
| 2005/0160424 A1 | 7/2005 | Broussard et al. |
| 2005/0198488 A1 | 9/2005 | Sandland et al. |
| 2005/0199714 A1 | 9/2005 | Brandt et al. |
| 2005/0210467 A1 | 9/2005 | Zimmer et al. |
| 2005/0216424 A1 | 9/2005 | Gandre et al. |
| 2005/0237330 A1 | 10/2005 | Stauffer et al. |
| 2005/0251446 A1 | 11/2005 | Jiang et al. |
| 2005/0268298 A1 | 12/2005 | Hunt et al. |
| 2005/0289540 A1 | 12/2005 | Nguyen et al. |
| 2005/0289648 A1 | 12/2005 | Grobman et al. |
| 2006/0050929 A1 | 3/2006 | Rast et al. |
| 2006/0069828 A1 | 3/2006 | Goldsmith |
| 2006/0149665 A1 | 7/2006 | Weksler |
| 2006/0155862 A1 | 7/2006 | Kathi et al. |
| 2006/0178937 A1 | 8/2006 | Rau et al. |
| 2006/0178994 A1 | 8/2006 | Stolfo et al. |
| 2006/0259390 A1 | 11/2006 | Rosenberger |
| 2007/0038997 A1 | 2/2007 | Grobman et al. |
| 2007/0078760 A1 | 4/2007 | Conaty et al. |
| 2007/0079307 A1 | 4/2007 | Dhawan et al. |
| 2007/0088762 A1 | 4/2007 | Harris et al. |
| 2007/0089111 A1 | 4/2007 | Robinson et al. |
| 2007/0170247 A1 | 7/2007 | Friedman |
| 2007/0171921 A1 | 7/2007 | Wookey et al. |
| 2007/0174410 A1 | 7/2007 | Croft et al. |
| 2007/0174429 A1 | 7/2007 | Mazzaferri et al. |
| 2007/0179885 A1 | 8/2007 | Bird et al. |
| 2007/0179955 A1 | 8/2007 | Croft et al. |
| 2007/0180447 A1 | 8/2007 | Mazzaferri et al. |
| 2007/0180448 A1 | 8/2007 | Low et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192329 A1 | 8/2007 | Croft et al. |
| 2007/0198656 A1 | 8/2007 | Mazzaferri et al. |
| 2007/0229505 A1 | 10/2007 | de Souza et al. |
| 2007/0234212 A1 | 10/2007 | de Souza et al. |
| 2007/0265961 A1 | 11/2007 | Shah et al. |
| 2008/0015988 A1 | 1/2008 | Brown et al. |
| 2008/0046349 A1 | 2/2008 | Elberg et al. |
| 2008/0077917 A1 | 3/2008 | Chen et al. |
| 2008/0179395 A1 | 7/2008 | Dixon et al. |
| 2008/0215770 A1 | 9/2008 | Liu et al. |
| 2008/0222375 A1 | 9/2008 | Kotsovinos et al. |
| 2008/0244546 A1 | 10/2008 | Schmelter et al. |
| 2008/0297433 A1 | 12/2008 | Heller et al. |
| 2009/0037333 A1 | 2/2009 | Flitcroft et al. |
| 2009/0037672 A1 | 2/2009 | Colbert et al. |
| 2009/0043702 A1 | 2/2009 | Bennett |
| 2009/0083734 A1 | 3/2009 | Hotra |
| 2009/0083756 A1 | 3/2009 | Kim et al. |
| 2009/0098854 A1 | 4/2009 | Park et al. |
| 2009/0164382 A1 | 6/2009 | Sally |
| 2009/0172331 A1 | 7/2009 | Vembu et al. |
| 2009/0192935 A1 | 7/2009 | Griffin et al. |
| 2009/0204964 A1 | 8/2009 | Foley et al. |
| 2009/0240620 A1 | 9/2009 | Kendrick et al. |
| 2009/0313143 A1 | 12/2009 | Darensbourg et al. |
| 2009/0327131 A1 | 12/2009 | Beenau et al. |
| 2010/0036770 A1 | 2/2010 | Fourez et al. |
| 2010/0058335 A1 | 3/2010 | Weber |

(56) References Cited

U.S. PATENT DOCUMENTS

| | | |
|---|---|---|
| 2010/0082481 A1 | 4/2010 | Lin et al. |
| 2010/0094753 A1 | 4/2010 | Carlson et al. |
| 2010/0114739 A1 | 5/2010 | Johnston |
| 2010/0131415 A1 | 5/2010 | Sartipi et al. |
| 2010/0146074 A1 | 6/2010 | Srinivasan |
| 2010/0205065 A1 | 8/2010 | Kumar et al. |
| 2010/0211445 A1 | 8/2010 | Bodington |
| 2010/0217916 A1 | 8/2010 | Gao et al. |
| 2010/0256982 A1 | 10/2010 | Bhagchandani et al. |
| 2010/0257040 A1 | 10/2010 | Hunt |
| 2010/0312636 A1 | 12/2010 | Coulter et al. |
| 2011/0006113 A1 | 1/2011 | Uchikura |
| 2011/0055047 A1 | 3/2011 | Fox |
| 2011/0087592 A1 | 4/2011 | Van der Veen et al. |
| 2011/0106607 A1 | 5/2011 | Alfonso et al. |
| 2011/0127324 A1 | 6/2011 | Hirka et al. |
| 2011/0131133 A1 | 6/2011 | Hirka et al. |
| 2011/0145152 A1 | 6/2011 | McCown |
| 2011/0153402 A1 | 6/2011 | Craig |
| 2011/0153498 A1 | 6/2011 | Makhotin et al. |
| 2011/0161188 A1 | 6/2011 | Roberts |
| 2011/0161235 A1 | 6/2011 | Beenau et al. |
| 2011/0179136 A1 | 7/2011 | Twitchell, Jr. |
| 2011/0180598 A1 | 7/2011 | Morgan et al. |
| 2011/0191149 A1 | 8/2011 | Blackhurst et al. |
| 2011/0218849 A1 | 9/2011 | Rutigliano et al. |
| 2011/0238510 A1 | 9/2011 | Rowen et al. |
| 2011/0252278 A1 | 10/2011 | Kanno et al. |
| 2011/0282780 A1 | 11/2011 | French et al. |
| 2011/0288919 A1 | 11/2011 | Gross |
| 2011/0289001 A1 | 11/2011 | Bishop |
| 2011/0320345 A1 | 12/2011 | Taveau et al. |
| 2012/0011063 A1 | 1/2012 | Killian et al. |
| 2012/0016956 A1 | 1/2012 | Twitchell |
| 2012/0028609 A1 | 2/2012 | Hruska |
| 2012/0066046 A1 | 3/2012 | Satyavolu et al. |
| 2012/0066681 A1 | 3/2012 | Hason et al. |
| 2012/0109681 A1 | 5/2012 | Chapman et al. |
| 2012/0197773 A1 | 8/2012 | Grigg et al. |
| 2012/0234927 A1* | 9/2012 | Poidomani ......... G06K 19/0702 235/492 |
| 2012/0259768 A1 | 10/2012 | Mukherjee |
| 2012/0267432 A1 | 10/2012 | Kuttuva |
| 2013/0018793 A1 | 1/2013 | Wong et al. |
| 2013/0024289 A1 | 1/2013 | Cueli et al. |
| 2013/0134216 A1 | 5/2013 | Spodak et al. |
| 2013/0159178 A1 | 6/2013 | Colon et al. |
| 2013/0166402 A1 | 6/2013 | Parento et al. |
| 2013/0218698 A1 | 8/2013 | Moon et al. |
| 2013/0246202 A1 | 9/2013 | Tobin et al. |
| 2013/0262315 A1 | 10/2013 | Hruska |
| 2013/0262316 A1 | 10/2013 | Hruska |
| 2013/0275307 A1* | 10/2013 | Khan .................. G06Q 20/40 705/64 |
| 2013/0282588 A1 | 10/2013 | Hruska |
| 2014/0046848 A1 | 2/2014 | Radu et al. |

FOREIGN PATENT DOCUMENTS

| | | |
|---|---|---|
| JP | 2001-344545 A | 12/2001 |
| JP | 2003-150884 A | 5/2003 |
| JP | 2004-054903 A | 2/2004 |
| JP | 2004-508644 A | 3/2004 |
| JP | 2010-525461 A | 7/2010 |
| KR | 10-2002-0088023 A | 11/2002 |
| KR | 10-2005-0118457 A | 12/2005 |
| KR | 10-1130152 B1 | 3/2012 |
| WO | 2008/131021 A1 | 10/2008 |
| WO | 2015/119796 A1 | 8/2015 |

OTHER PUBLICATIONS

Shaikh, M., Office Action issued in copending U.S. Appl. No. 13/802,705, filed Mar. 13, 2013, pp. 1-32, dated Apr. 14, 2015.
Shaikh, M.1-20, Office Action issued in copending U.S. Appl. No. 13/802,705, filed Mar. 13, 2013, dated Oct. 7, 2014.
U.S. Appl. No. 13/802,705 to Andrews filed Mar. 13, 2013.
U.S. Appl. No. 11/846,842, filed Aug. 29, 2007, Hirka et al.
Lendino, J., How to Remotely Disable Your Lost or Stolen Phone, pcmag.co, pp. 1, Apr. 12, 2012.
Quittner, Jeremy, PayPal Seeks to Cut Out Card Companies with New Plastic, *Bank Technology News* , pp. 2, Oct. 18, 2011.
Shaikh, M., Office Action issued in copending U.S. Appl. No. 13/802,705, filed Mar. 13, 2013, pp. 1-11, dated Jul. 18, 2013.
Shaikh, M., Office Action issued in copending U.S. Appl. No. 13/802,705, filed Mar. 13, 2013, pp. 1-15, dated Apr. 21, 2014.
Shaikh, M., Office Action issued in copending U.S. Appl. No. 13/802,705, filed Mar. 13, 2013, pp. 1-21, dated Jan. 7, 2014.
U.S. Appl. No. 13/802,705 to Mark William Andrews filed Mar. 13, 2013.
Campen, "U.S. Office Action issued in copending U.S. Appl. No. 13/545,702, filed Jul. 10, 2012", dated Jun. 17, 2013, 14 pages.
Colbert, "U.S. Office Action issued in copending U.S. Appl. No. 13/759,003, filed Feb. 4, 2013", dated Jun. 6, 2013, 24 pages.
Johnson, "U.S. Office Action issued in copending U.S. Appl. No. 13/717,295, filed Dec. 17, 2012", dated Feb. 28, 2013, 13 pages.
Moussaid, "International Preliminary Report on Patentability issued in International Application No. PCT/US2015/012784", dated Aug. 18, 2016, 8 pages.
Nguyen, "U.S. Office Action issued in copending U.S. Appl. No. 13/784,808, filed Mar. 4, 2013", dated Jul. 15, 2013, 20 pages.
Niquette, "U.S. Office Action issued in copending U.S. Appl. No. 13/784,790, filed Mar. 4, 2013", dated Jun. 13, 2013, 11 pages.
Niquette, "U.S. Office Action issued in copending U.S. Appl. No. 13/784,790, filed Mar. 4, 2013", dated Nov. 5, 2013, 20 pages.
Oh, "International Search Report and Written Opinion issued in International Application No. PCT/US2013/049446", dated Oct. 22, 2013, 10 pages.
Premnath, "Australian Office Action issued in Australian Application No. 2013207643", dated Oct. 14, 2013, 3 pages.
Shaikh, "U.S. Office Action issued in copending U.S. Appl. No. 13/802,705, filed Mar. 13, 2013", dated Aug. 5, 2016, 60 pages.
Shaikh, "U.S. Office Action issued in copending U.S. Appl. No. 13/802,705, filed Mar. 13, 2013", dated Feb. 19, 2016, 38 pages.
Ziegle, "U.S. Office Action issued in copending U.S. Appl. No. 13/658,783, filed Oct. 23, 2012", dated Mar. 5, 2013, 14 pages.
Ziegle, "U.S. Office Action issued in copending U.S. Appl. No. 13/658,783, filed Oct. 23, 2012", dated Jul. 11, 2013, 16 pages.
Tan, "Australian Office Action issued in Australian Application No. 2015214545", dated Dec. 8, 2016, 10 pages.
Shaikh, "U.S. Office Action issued in copending U.S. Appl. No. 13/802,705, filed Mar. 13, 2013", dated Feb. 24, 2017, 49 pages.
Moynihan, "Extended European Search Report issued in European Application No. 15746583.2", dated Jul. 31, 2017, 7 pages.
Shaikh, "U.S. Office Action issued in copending U.S. Appl. No. 13/802,705, filed Mar. 13, 2013", dated Aug. 10, 2017, 49 pages.
Park, "Korean Office Action issued in Korean Application No. 10-2016-7022928", dated May 20, 2017, 8 pages of English Translation and 8 pages of Korean Office Action.
Ziaie, "Canada Office Action received for Canada Patent Application No. 2,938,936", dated Apr. 18, 2017, 3 pages.
Endou, "Japanese Office Action issued in Japanese Application No. 2016-550524", dated Sep. 4, 2017, 12 pages of English Translation and 11 pages of Japanese Office Action.

* cited by examiner

DYNAMIC ALTERATION OF TRACK DATA

TECHNICAL FIELD

The present disclosure relates generally to digital wallet account transactions, and more particularly to using discretionary data fields to secure transactions.

BACKGROUND

Digital wallet accounts on payment processing systems enable users to utilize a user computing device to conduct transactions. A user applies the wallet account to a transaction with the merchant's point-of-sale system via near field communication, WI-Fi, Bluetooth, infrared, or in any suitable manner. The payment processing system can utilize the provided financial account to conduct the transaction with the merchant.

Digital wallet accounts and user computing devices often have certain authorization and authentication procedures to reduce fraud. For example, a user computing device may require a password to access the digital wallet application module. However, conventional systems do not allow the user computing device to provide security information to a payment processing system via the discretionary data field on a payment instrument.

SUMMARY

Techniques herein provide a computer-implemented method to use discretionary data fields to secure transactions. A payment system employs a server configured to associate a payment account of a user with a user computing device, the payment account comprising a payment account identifier that identifies the payment account, and to establish an authentication challenge and a corresponding challenge response. The payment system receives a first payment authorization request originating from a merchant computing system, the first payment authorization request comprising the payment account identifier, data associated with the payment account identifier, and a request to fund a transaction using the payment account, wherein the data associated with the payment account identifier comprises a challenge response provided by the user computing device located in a discretionary data field. The payment system compares the provided challenge response with the corresponding challenge response, and replies to the merchant computing system with a responsive authorization state, wherein the responsive authorization state is determined based on the determination whether the provided challenge response and the corresponding challenge response match.

In certain other example aspects described herein, a system and a computer program product to use discretionary data fields to secure transactions.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

In one example embodiment, a user attempts a transaction with a merchant point of sale ("POS") terminal. When the user selects a payment instrument, such as a credit card, to use, a digital wallet communicates with a payment processing system to obtain an authentication challenge. In certain embodiments, the authentication challenge resides in the user computing device, and the payment processing system does not need to be contacted. The digital wallet populates a discretionary data field of the payment instrument being used with a challenge response. The payment instrument information, including the discretionary data field, is transmitted to a POS terminal to conduct the transaction. The POS terminal communicates the transaction request to the payment processing system. The payment processing system accesses the challenge response from the discretionary data field. If the challenge response is acceptable, then the transaction proceeds.

In one example embodiment of a wallet account, payment processing systems enable users to utilize a payment account to conduct transactions. The user associates one or more financial accounts with the wallet account. For example, the user can associate with the user's wallet account or more debit/credit cards maintained by multiple issuers (including the payment processing system operating as an issuer), stored value cards (for example, gift cards, prepaid cards, re-loadable transaction cards, exchange cards, and other forms of non-credit based value cards), loyalty cards or other store rewards cards, value added service accounts (for example, coupons, vouchers for prepaid offers, redemption offers, and other forms of offers), peer-to-peer transaction accounts, bank accounts and/or other forms of financial accounts.

The wallet account can be represented on a digital wallet application module or other payment application on a user computing device, such as a mobile phone. For example, the user wallet account information, such as a wallet account identifier, can be stored on the user computing device for use in a payment transaction by the digital wallet application module or other application.

To conduct a transaction using a wallet account on a user computing device, the user can communicate the wallet account identifier and other transaction data to a merchant point of sale ("POS") terminal using the user computing device via near field communication ("NFC"), barcode, BLUETOOTH, Wi-Fi communication, infrared, or other suitable communication technology. Alternatively, the wallet account can have thereto associated a physical payment card comprising a magnetic stripe or other machine-readable portion comprising the user's wallet account identifier and other payment information. In this case, the user scans or swipes the wallet account at the merchant POS terminal to communicate the wallet account identifier and other transaction data to the merchant POS terminal. Additionally or alternatively, the wallet account can be represented as any other suitable payment instrument, such as an RFID device or a smartcard. Additionally or alternatively, the payment account can be a digital wallet application module or other payment account on a user computing device for conducting online transactions, such as a mobile or desktop computer, laptop computer, or a television with one or more processors embedded therein and/or coupled thereto.

Continuing the example of a conventional transaction, the merchant system creates a payment request for the transaction using the wallet account information and forwards the payment request to an acquirer, which forwards the payment request to a card network. The card network forwards the payment request to the payment processing system, which may function as the issuer of the payment instrument for the payment request.

The payment processing system reads wallet account information from the payment request and accesses the user's account associated with the wallet account. If the payment processing system is the issuer of the particular financial account selected as the backing account for the wallet account transaction, the payment processing system will approve or decline the transaction.

If another issuer maintains the particular financial account to be used as the backing account for the transaction, the payment processing system will generate and send a new payment request for the transaction to the other issuer via the card network (or via a different card network). The payment processing system receives an authorization message from the other issuer via the card network if the transaction is approved.

The payment processing system forwards an authorization to the acquirer through the card network, which forwards the authorization to the merchant system. The authorization is based on the payment processing system's determination as the issuer to authorize the transaction or the authorization received from the other issuer.

The merchant system then approves the transaction, based on the authorization received from the payment processing system.

In certain example embodiments, the user and/or the payment processing system establish a security procedure for transactions. The security procedure may be a particular challenge and response, an interrogation of the user computing device, a location verification, or any suitable procedure. The details of example security procedures will be described herein.

In an example embodiment, the user initiates a purchase at a merchant location. The user opens the digital wallet application module executing on the user computing device. The digital wallet application module represents any application or other user interface system the user employs to conduct wallet account and other transactions via the user computing device. The user accesses the wallet account of the user via the digital wallet application module.

The user can select a payment account associated with the wallet account to be the used for the subsequent transaction. In certain embodiments, at the time that a user indicates that a transaction is imminent, such as by opening the digital wallet application module, the user computing device accesses the authentication challenge that has been configured for the account. In one example embodiment, the authentication challenge is stored in the digital wallet application module, on the secure element, in other memory, or in any suitable location on the user computing device. In an alternate example embodiment, at the time that a user indicates that a transaction is imminent, the user computing device contacts the payment processing system to request an authentication challenge. The user computing device may contact the payment processing system over the Internet via a Wi-Fi signal, a cellular communication, an email, a text, or any suitable communication technology. When contacted, the payment processing system transmits the authentication challenge to the user computing device.

In alternate example embodiments, the user computing device accesses the authentication challenge after the merchant POS terminal provides a transaction request to the user computing device. For example, the POS terminal receives an initiation of a transaction and transmits a request to the user computing device to provide payment information. At the time of the request from the POS terminal, the user computing device may access the authentication challenge or request the authentication challenge from the payment processing system.

The authentication challenge may be a challenge/response question for the user. For example, the challenge may be a question for which an answer has been previously configured with the payment processing system. One example question may be "what is your mother's maiden name?" Another question may be "In what city were you born?" Any suitable question may be used. The challenge question may be displayed on the user interface of the user computing device. The user enters the appropriate response into the user interface of the user computing device. The response must be stored on the device and or at the payment processing system if configured prior to the transaction.

In another example, the authentication challenge may be directed to the user computing device. For example, the challenge may be a request for the identification number of the user computing device, the model number of the user computing device, or a similar request. In another example, the payment processing system may request the location of the user computing device. The location may be accessed from a global positioning system ("GPS") technology on the user computing device, from a Wi-Fi location technology, or any suitable technology. In another example, data from the transaction history of the user computing device may be used. For example, the time or location of the last successful transaction may be requested.

The user computing device communicates payment account information to the merchant point of sale ("POS") system, comprising the wallet account identification and challenge response. For example, the user can select a product for purchase at a merchant location and conduct the purchase transaction at a POS terminal of the merchant system.

The wallet account information that is stored in the digital wallet application module on the user computing device is used to make a payment to the merchant. The wallet account information is transmitted to the POS terminal via NFC, Bluetooth, barcode displayed via the user computing device, Wi-Fi, or other form of communication. The user can initiate the communication by performing a wireless "tap" of the user computing device with the POS terminal or any other suitable action, such as by actuating a real or virtual button on the user computing device or speaking a command into the user computing device. In an alternative example embodiment, a purchase is initiated by use of an RFID device, smartcard, barcode displayed on the user computing device, or other suitable medium that can be read by the POS terminal.

When a transaction is initiated, the digital wallet application module can access the wallet account information residing in the digital wallet application module or other secured or unsecure storage in the user computing device, including the challenge response. If a challenge response has been supplied by the user or by the user computing device, then the digital wallet application module includes the response in the transaction details being transmitted to the POS terminal. The response may be transmitted in a discretionary data field of the wallet account information. As the challenge response may be located in a discretionary data field, the challenge response is not utilized by the merchant system or the POS terminal; however, the challenge response information is still communicated to the payment processing system by the merchant system.

In an example embodiment, the challenge response is the answer provided by the user to a challenge question. In another example, the challenge response is a GPS location of the user computing device. In another example, the challenge response is an identification number of the user computing device. In another example, the challenge response is specific transaction related data that was requested from the user computing device, such as the time of the last transaction.

A payment authorization request is communicated to the payment processing system from the POS terminal. The request includes the wallet account identification and challenge response. The POS terminal communicates a payment authorization request to the payment processing system to obtain payment for the purchase transaction between the user and the merchant. The payment authorization request comprises transaction details, such as the product being purchased, the total price, the merchant system information, the wallet account information, and other suitable data.

The payment processing system receives the payment authorization request and determines if the challenge response is accepted. Along with the wallet account information, the payment processing system identifies the challenge response from the provided data. The payment processing system accesses the wallet account of the user based on the wallet account information provided in the request and determines if the challenge response is appropriate. For example, the payment processing system can determine if an answer provided by the user matches the configured expected answer. In an example, the expected answer to the question "What is your mother's maiden name?" is "Jones." If the user answered "Jones," and the answer was transmitted to the payment processing system, then the payment processing system determines that the challenge response is accepted.

In another example, the challenge response is the GPS location of the user computing device. The payment processing system determines the expected GPS location of the user computing device based on the location of the merchant identified in the transaction details. For example, the user computing device identifies the merchant and accesses the location of the merchant from a database of merchant locations. The payment processing system compares the location of the merchant with the location of the user computing device. If the locations match, then the payment processing system determines that the user computing device is located at the merchant and the likelihood of a fraudulent transaction is reduced.

In another example, the challenge response is a detail from a recent transaction. The user computing device determines the last transaction conducted by the user with the user computing device and extracts a particular detail, such as the time of the last transaction. The payment processing system compares the time of the last transaction of the user computing device with the time of the last transaction stored in a memory of the payment processing system. If the times match, then the payment processing system determines that the user computing device is the same user computing device previously used and the likelihood of a fraudulent transaction is reduced.

Any suitable response to a suitable challenge may be provided. For example, an identification number of the user computing device or a personal identification number.

If the wallet account on the payment processing system functions as a proxy account, then the payment processing system can initiate a second transaction with an issuer of the selected backing account to fund the merchant transaction. The payment processing system can transmit an approval or refusal of the transaction to the merchant system, based on approval or refusal of the transaction with the selected backing account.

The payment processing system approves the transaction based on transaction details and challenge response. If the challenge response is accepted and the transaction is approved, then the payment processing system transmits the approval to the POS terminal. The merchant system receives the approval, provides the purchased product or service to the user, and logs the transaction. The transaction funds are remitted to the merchant system.

Example System Architectures

Turning now to the drawings, in which like numerals represent like (but not necessarily identical) elements throughout the figures, example embodiments are described in detail.

Figure 1:
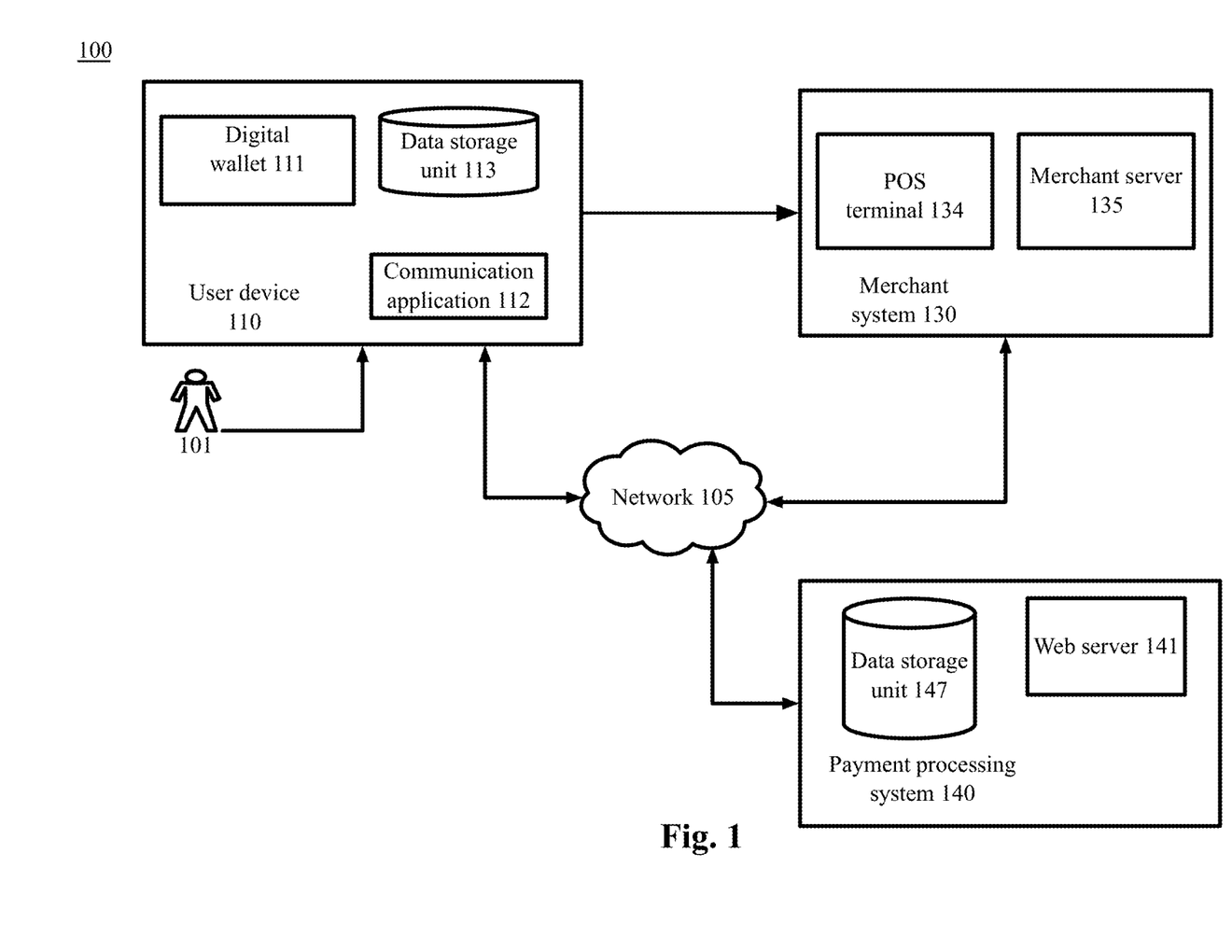
FIG. 1 is a block diagram depicting a system for using discretionary data fields to secure transactions, in accordance with certain example embodiments.

FIG. 1 is a block diagram depicting a system for using discretionary data fields to secure transactions, in accordance with certain example embodiments. In some embodiments, a user associated with a device must install an application and/or make a feature selection to obtain the benefits of the techniques described herein.

As depicted in FIG. 1, the system 100 includes network computing devices 110, 130, and 140 that are configured to communicate with one another via one or more networks 105 or via any suitable communication technology.

Each network 105 includes a wired or wireless telecommunication means by which network devices (including devices 110, 130, and 140) can exchange data. For example, each network 105 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data. Throughout the discussion of example embodiments, it should be understood that the terms "data" and "information" are used interchangeably herein to refer to text, images, audio, video, or any other form of information that can exist in a computer-based environment. The communication technology utilized by the devices 110, 130, and 140 may by similar networks to network 105 or an alternative communication technology.

Each network computing device 110, 130, and 140 includes a device having a communication module capable of transmitting and receiving data over the network 105 or a similar network. For example, each network device 110, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 130, and 140 are operated by end-users or consumers, merchant system operators, and payment processing system operators, respectively.

The user 101 can use the communication application 112, which may be, for example, a web browser application or a stand-alone application, to view, download, upload, or otherwise access documents or web pages via a distributed network 105. The communication application 112 can interact with web servers or other computing devices connected to the network 105, including the point of sale terminal 134 of the merchant system 130, the merchant server 135 of the merchant system 130, and the web server 144 of the payment processing system 140.

The user network device 110 may include a digital wallet application module 111. The digital wallet application module 111 may encompass any application, hardware, software, or process the user computing device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112. The digital wallet application module 111 may use a wallet account of the user 101 that is managed by the payment processing system 140 or another suitable system. The wallet account may execute on the user computing device 110 independent of the digital wallet application module 111 and the communication application 112.

The wallet account may allow the user 101 to set rules, confirm transactions, select preferred accounts for a transaction, receive notice of a account selection, and provide other suitable services. Any functions of the wallet account can be performed on the digital wallet application module 111. Additionally or alternatively, any function of the wallet account and the digital wallet application module 111 can be performed on or by the payment processing system 140.

The user computing device 110 also includes a data storage unit 113 accessible by the digital wallet application module 111, the wallet account application 115, and the communication application 112. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory accounts or removable flash memory.

The user 101 may use the user computing device 110 or other network device to register the digital wallet application module 111 and/or access the payment processing system account of the user 101. The user computing device 110 may comprise appropriate technology that includes or is coupled to a web server.

The wallet account or other payment account can have thereto associated a magnetic strip card. The magnetic stripe card can be a physical payment card comprising a magnetic stripe or other machine-readable portion comprising the user's wallet account identifier and other payment information. In this case, the user scans or swipes the magnetic stripe card at the merchant POS terminal 134 to communicate the wallet account identifier and other transaction data to the POS terminal 134. Additionally or alternatively, the wallet account can have thereto associated any other suitable payment instrument, such as an RFID device or a smartcard.

The payment processing system 140 includes a data storage unit 147 accessible by the web server 144. The example data storage unit 147 can include one or more tangible computer-readable storage devices. The payment processing system 140 is operable to conduct wireless and other payments between a user 101 and a merchant system 130. The payment processing system 140 is further operable to maintain a database to store transactions of the merchant system 130 and the user 101, recommend automatic payment recipients, and other suitable functions.

The user 101 can access a web server 141 on the payment processing system 140 to view, register, download, upload, or otherwise access the payment processing system 140 via a website (not illustrated) and a communication network 105). The user 101 associates one or more registered financial accounts, including bank account debit cards, credit cards, gift cards, loyalty cards, coupons, offers, prepaid offers, store rewards cards, or other type of financial account that can be used to make a purchase or redeem value-added services with a payment account of the user 101. A financial account issuer may be the issuer of the financial account being registered. For example, the financial account issuer may be a credit card issuer, a debit card issuer, a stored value card issuer, a financial institution providing an account, or any other provider of a financial account. The payment processing system 140 also may function as the issuer for the associated financial account. The user's 101 registration information is saved in the payment processing system's 140 data storage unit 147 and is accessible the by web server 141.

The user 101 also may use the web server 141 to define payment rules. The creation of a backing account model for a user is discussed in more detail hereinafter with reference to the methods described in FIG. 2.

The user 101 may request a purchase from the merchant system 130. In an example embodiment, the purchase is initiated by a wireless "tap" of the mobile device 110 with the POS terminal 134. In an alternative example embodiment, the purchase is initiated when the user 101 enters an account identification number at the POS terminal 134 or in the mobile device 110. In another alternative example embodiment, the purchase is initiated online with the merchant server 135. The purchase may be initiated via a merchant website (not pictured). In yet another alternative example embodiment, the purchase is initiated by use of a permanent/temporary virtual/physical token, QR code, bar code, or other suitable machine-readable medium captured by the POS terminal 134. The merchant's POS terminal 134 interacts with an acquirer, the card network, the payment processing system 140, and the issuer.

The POS terminal 134 may be separate and distinct from the merchant server 135. The merchant server 135 can be a server located at a physical location of the POS terminal 134 or in a remote location. The POS terminal 134 can communicate transaction information with the merchant server 135 in circumstances where it would be advantageous for transaction storage or for any suitable reason. In an example, the POS terminal 134 is utilized for transactions at a physical location and the merchant server is utilized for online transactions. In another example, the POS terminal 134 and the merchant server 135 are logically connected to each other and are both utilized for a transaction at a location of a merchant system 130. In another example, the POS terminal 134 conducts all transactions at a location of a merchant system 130 and no merchant server 135 is utilized.

It will be appreciated that the network connections shown are example and other means of establishing a communications link between the computers and devices can be used. Moreover, those having ordinary skill in the art having the benefit of the present disclosure will appreciate that the merchant system 130, payment processing system 140, and the user computing device 110 illustrated in FIG. 1 can have any of several other suitable computer system configurations. For example, a user computing device 110 embodied as a mobile phone or handheld computer may not include all the components described above.

Example Processes

Figure 2:
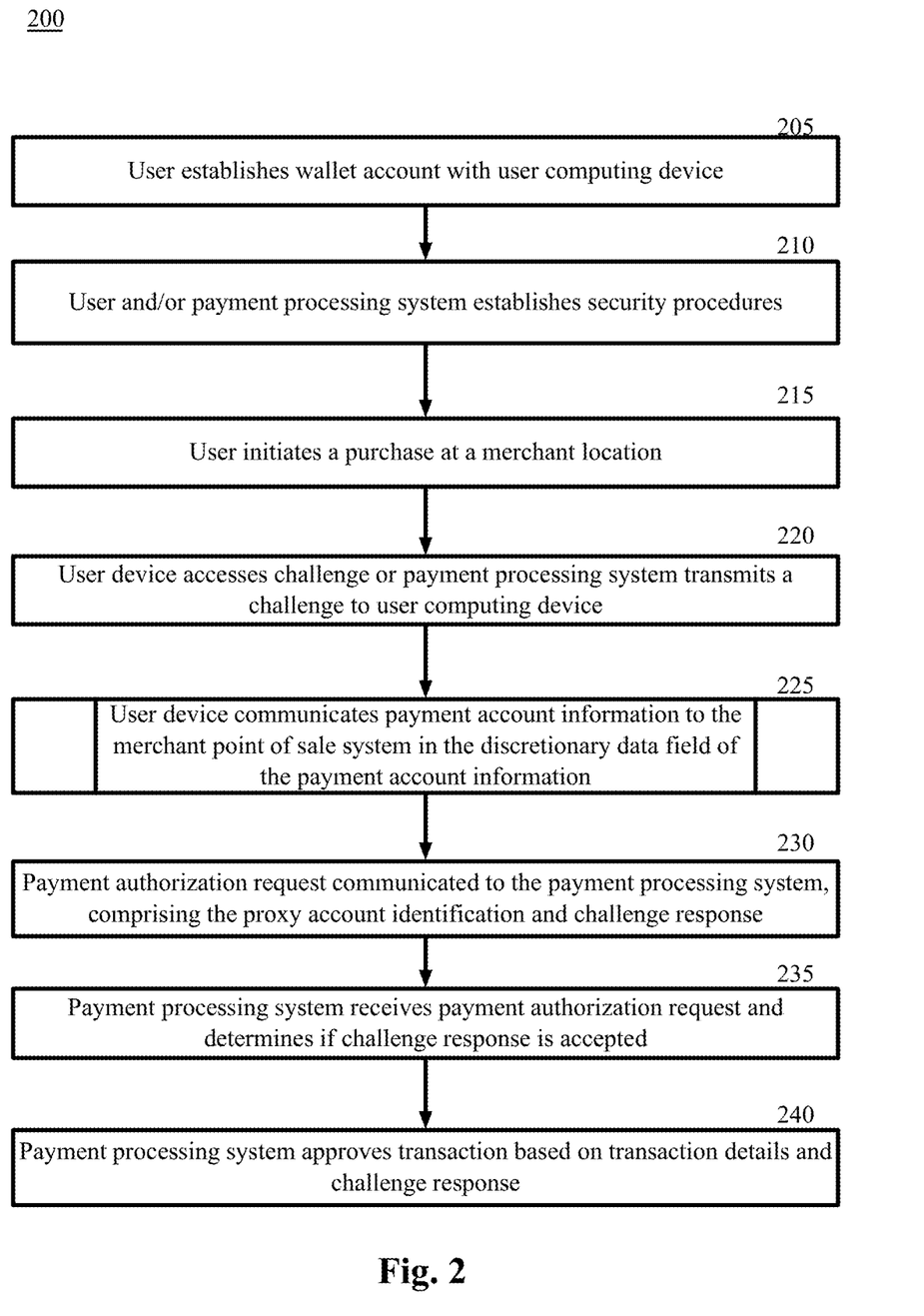
FIG. 2 is a block flow diagram depicting a method for using discretionary data fields to secure transactions, in accordance with certain example embodiments.
Figure 3:
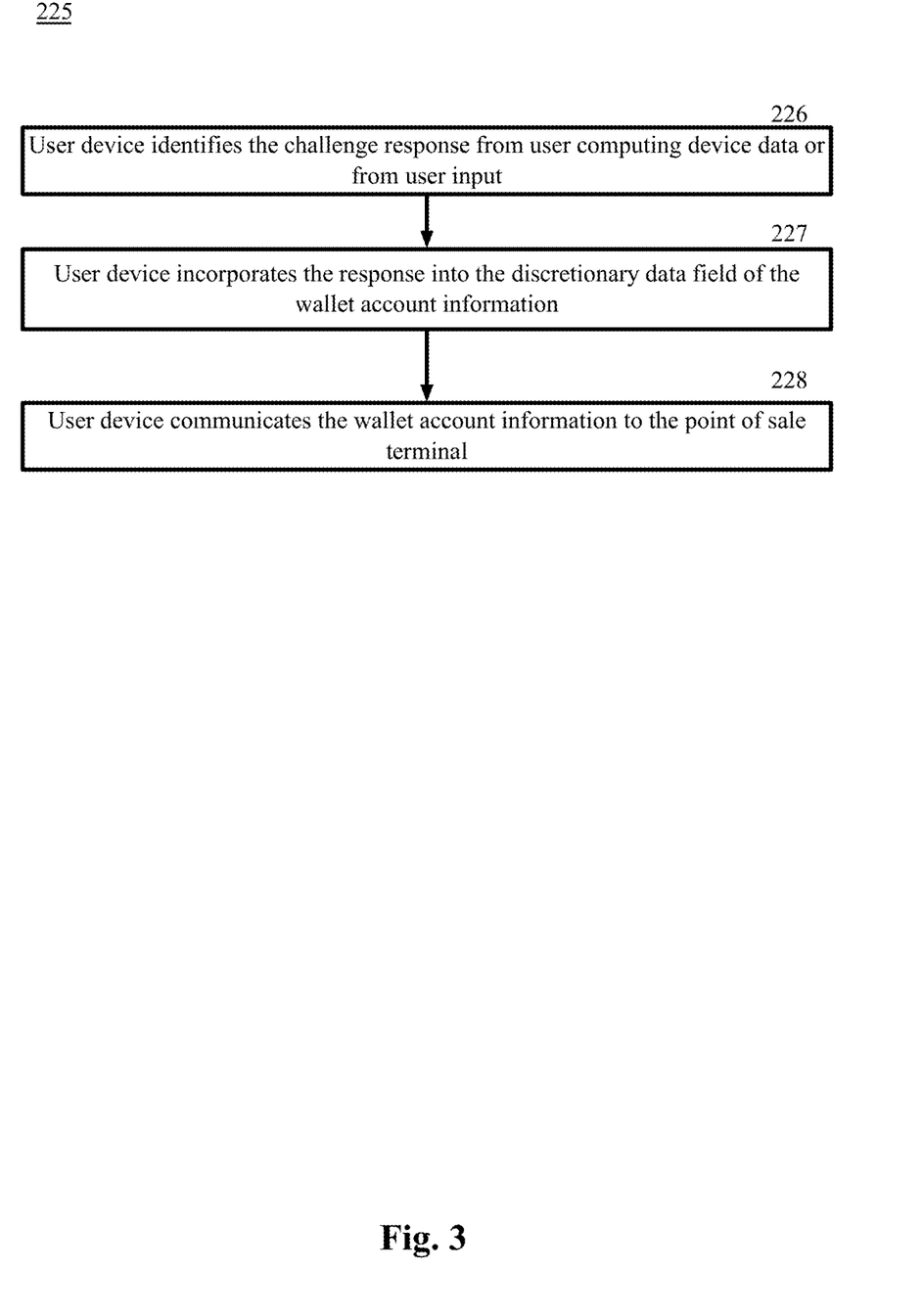
FIG. 3 is a block flow diagram depicting a method for the user computing device to communicate payment account information to the merchant POS terminal in the discretionary data field of the payment account information, in accordance with certain example embodiments.

The example methods illustrated in FIGS. 2-3 are described hereinafter with respect to the components of the example operating environment 100. The example methods of FIG. 2-3 may also be performed with other systems and in other environments.

FIG. 2 is a block flow diagram depicting a method 200 for using discretionary data fields to secure transactions, in accordance with certain example embodiments.

With reference to FIGS. 1 and 2, in block 205, user 101 establishes a wallet account with the user computing device 110 and the payment processing system 140. In an example embodiment, the user 101 requests a wallet account using a web server 141, and the wallet account is associate with the user 101. The user 101 may be issued an account number to be used for transactions via the Internet before or after a physical card is received. In an alternative example embodiment, the payment processing system 140 mails an inactivated wallet account card to the user 101. The wallet account is then activated by the user 101 before use. In an example embodiment, a physical wallet account card is not issued. The wallet account information can be stored in the user computing device 110 and is used to make a payment via a NFC, Bluetooth, barcode, Wi-Fi, or other form of wireless tap of the user computing device 110 with the point of sale ("POS") terminal 134. In an alternative example embodiment, the purchase is initiated when the user 101 enters an account identification number at the POS terminal 134 or in the user computing device 110. The account identification number may be the wallet account number or a different number that links the payment transaction to the wallet account. In yet another alternative example embodiment, a purchase is initiated by use of a permanent/temporary virtual/physical token QR code, bar code, or other suitable machine-readable medium that is read by the POS terminal 134. In these cases, the POS terminal 134 may comprise a scanner, camera, or other reading device that captures the wallet account information, such as a bar code or QR reader or other suitable reading device. The wallet account information may be printed in paper or other form.

In block 210, the user 101 and/or the payment processing system 140 establish a security procedure for transactions. The security procedure may be a particular challenge and response, an interrogation of the user computing device, a location verification, or any suitable procedure. The details of example security procedures are described herein.

In block 215, the user 101 initiates a purchase at a merchant system 130 location, a website, or at any virtual location. The user 101 opens the digital wallet application module 111 executing on the user computing device. The digital wallet application module 111 represents any application or other user interface system the user 101 employs to conduct wallet account transactions and other transactions via the user computing device 110. The user 101 accesses the wallet account of the user 101 via the digital wallet application module 111 of the user computing device 110. The user 101 may select a payment account associated with the wallet account to be the used for the subsequent transaction.

In block 220, at the time that the user 101 indicates that a transaction is imminent, the user computing device 110 accesses the authentication challenge that has been configured for the account. In one example embodiment, the authentication challenge is stored in the digital wallet application module 111, on the secure element or other secure memory, or in any suitable location on the user computing device 110. In certain embodiments, the challenge request may be updated by the payment processing system 140 when the user computing device 110 and the payment processing system 140 are in communication. In an alternate example embodiment, at the time that a user 101 indicates that a transaction is imminent, the user computing device 110 contacts the payment processing system 140 to request an authentication challenge. The user computing device 110 may contact the payment processing system 140 over the Internet via a Wi-Fi signal, a cellular communication, an email, a text, or any suitable communication technology. When contacted, the payment processing system 140 transmits the authentication challenge request to the user computing device 110.

In alternate embodiments, the user computing device 110 accesses the authentication challenge after the merchant POS terminal 134 provides a transaction request to the user computing device 110. For example, the POS terminal 134 receives an initiation of a transaction from the user 101 or a merchant system operator, and transmits a request to the user computing device 110 to provide payment information. At the time of the request from the POS terminal 134, the user computing device 110 may access the authentication challenge.

The authentication challenge may be a challenge/response question for the user 101. For example, the challenge may be a question for which an answer has been previously configured with the payment processing system 140. One example question may be "What is your mother's maiden name?" Another question may be "In what city were you born?" Any suitable question may be used. The challenge question may be displayed on the user interface of the user computing device 110. The user enters the appropriate response into the user interface of the user computing device.

Figure 4:
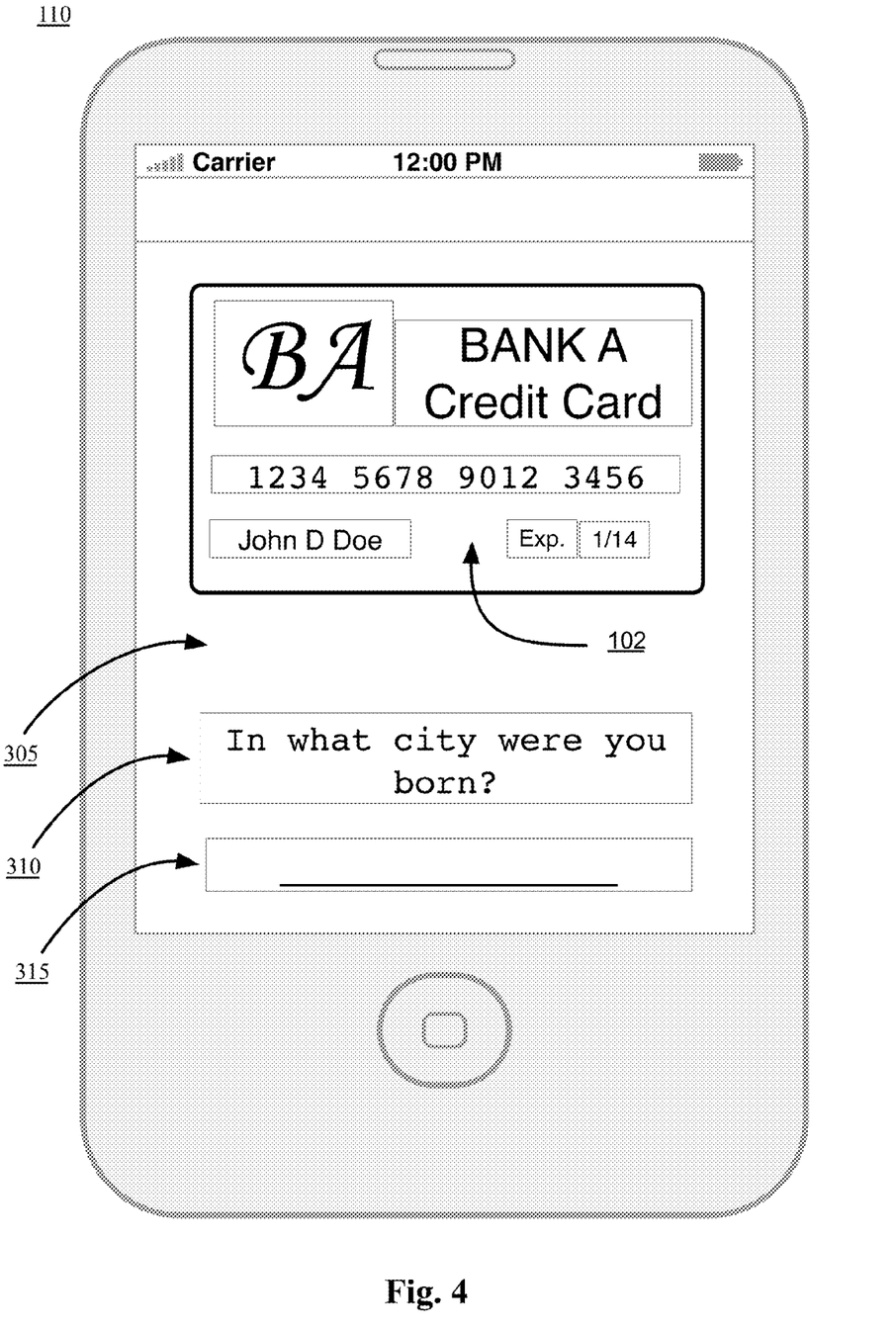
FIG. 4 is an illustration of a user computing device requesting an authentication response, in accordance with certain example embodiments.

FIG. 4 is illustration of a user computing device requesting authentication data, in accordance with certain example embodiments. The user computing device 110 is illustrated on a user interface screen 305 of the user computing device 110. The user interface displays a credit card 102 which the user 101 has indicated will be used for a transaction. The user interface displays the challenge question 310 "In what city were you born?" The user 101 is provided a module 315 to enter the response challenge. In the example, the user may type the response with a keyboard associated with the user computing device 110.

In another example, the authentication challenge may be directed to the user computing device 110. For example, the challenge may be a request for the identification number of the user computing device 110, the model number of the user computing device 110, or a similar request. In another example, the authentication challenge may request the location of the user computing device 110. The location may be accessed from a global positioning system ("GPS") technology on the user computing device, from a Wi-Fi location technology, or any suitable technology. In another example, data from the transaction history of the user computing device 110 may be used. For example, the time or location of the last successful transaction may be requested. The user computing device 110 accesses the challenge request and determines the appropriate response. The response may be accessed from the memory of user computing device 110 or received from the user 101 input.

Returning to FIG. 2, in block 225, the user computing device 110 communicates payment account information to the merchant POS terminal 134 in the discretionary data field of the payment account information. The details of block 225 are described in further detail with regard to method 225 in FIG. 3.

FIG. 3 is a block flow diagram depicting a method for the user computing device 110 to communicate payment account information to the merchant POS terminal 134 in the discretionary data field of the payment account information, in accordance with certain example embodiments.

In block 226, the user computing device 110 identifies the challenge response from user computing device 110 data or from user 101 input. In an example, the user computing device 110 accesses the challenge from the memory of the user computing device 110 or from the payment processing system 140. The user computing device 110 accesses the challenge response from the memory of the user computing device 110 or from an input of the user 101.

In block 227, the user computing device 110 incorporates the response into the discretionary data field of the wallet account information. The user computing device 110 identifies the discretionary data field of the payment account information that is available for discretionary data input. The user computing device 110 inserts the challenge response into the discretionary data field.

In block 228, user computing device 110 communicates the wallet account information to the POS terminal 134. The wallet account information is transferred to the POS terminal 134 via NFC, Bluetooth, barcode, Wi-Fi, or other form of communication. The user 101 can initiate the communication by performing a wireless "tap" of the user computing device 110 with the POS terminal 134 or any other suitable action, such as by actuating a real or virtual button on the user computing device 110 or speaking a command into the user computing device 110. In an alternative example embodiment, a purchase is initiated by use of an RFID device, smartcard, barcode displayed on the user computing device 110, or other suitable medium that can be read by the POS terminal 134.

When a transaction is initiated, the digital wallet application module 111 can access the wallet account information residing in the digital wallet application module 111 including the challenge response. If a challenge response has been supplied by the user 101 or by the user computing device 110, then the digital wallet application module 111 can include the response in the transaction details being transmitted to the POS terminal 134.

The response may be transmitted to the POS terminal 134 in the discretionary data field of the wallet account information. Data fields of conventional wallet account information may be made up of information related to the wallet account. For example, a data field may contain a format code, a primary account number, a user name, an expiration date, a longitudinal redundancy check, or other suitable data. A discretionary data field may be included in the conventional wallet account information. Conventional wallet accounts may include in the discretionary data field a PIN verification key a card verification code. In the example, the challenge response is incorporated into the discretionary data field. The challenge response may replace other discretionary data or be added to other discretionary data.

As the challenge response can be located in a discretionary data field, the response is not utilized by the merchant system 130 or the POS terminal 134; however, the merchant system 130 communicates the challenge response in the discretionary data field to the payment processing system 140 with the transaction details.

In an example embodiment, the challenge response is the answer provided by the user 101 to a challenge question. In another example, the challenge response is a GPS location of the user computing device 110. In another example, the challenge response is an identification number of the user computing device 110. In another example, the challenge response is specific transaction related data that was requested from the user computing device 110, such as the time of the last transaction.

Returning to FIG. 2, in block 230, a payment authorization request is communicated to the payment processing system 130 from the POS terminal 134. The request includes the wallet account identification and challenge response. The POS terminal 134 communicates a payment authorization request to the payment processing system 140 to obtain payment for the purchase transaction between the user 101 and the merchant system 130. The payment authorization request comprises transaction details, such as the product being purchased, the total price, the merchant system information, the wallet account information, and other suitable data. The request may be transmitted via an acquirer, to the credit card network, and then to the payment processing system 140.

In block 235, the payment processing system 140 receives the payment authorization request and determines if the challenge response is accepted. Along with the wallet account information, the payment processing system 140 identifies the challenge response from the provided data. The payment processing system 140 accesses the wallet account of the user 101 and determines if the challenge response is appropriate. The payment processing system 140 reads the wallet account identification information from the payment authorization request and identifies the wallet account from the account identifier information. The payment processing system 140 identifies the challenge response that is stored in the discretionary data field. The payment processing system 140 determines if the challenge response matches an expected response. If the response matches, the payment processing system 140 approves the transaction as long as the other transaction details are appropriate (such as, the payment amount being within an amount authorized).

For example, to determine if the challenge response matches and expected response, the payment processing system 140 can determine if an answer provided by the user matches the configured expected answer. In an example, the expected answer to the question "What is your mother's maiden name?" is "Jones." If the user answered "Jones" and the answer was transmitted to the payment processing system 140, then the payment processing system 140 determines that the challenge response is accepted.

In another example, the challenge response is the GPS location of the user computing device 110. The payment processing system 140 determines the expected GPS location of the user computing device 110 based on the location of the merchant system 130 identified in the transaction details. For example, when the payment processing system 140 identifies the challenge response in the discretionary data field of the wallet account information, the user computing device 110 identifies the merchant system 130 from the transaction information. The payment processing system 140 accesses the location of the merchant system 130 from a database of merchant system 130 locations. The payment processing system 140 compares the location of the merchant system 130 with the location of the user computing device 110. If the locations match, then the payment processing system 140 determines that the user computing device 110 is located at the merchant system 130 and the likelihood of a fraudulent transaction is reduced.

In another example, the challenge response is a detail from a recent transaction. The user computing device 110 determines the last transaction conducted by the user 101 with the user computing device 110 and extracts a particular detail, such as the time of the last transaction. The payment processing system 140 compares the time of the last transaction of the user computing device 110 with the time of the last transaction stored in a server 141 of the payment processing system 140. If the times match, then the payment processing system 140 determines that the user computing device 110 is likely to be the same user computing device 110 previously used and the likelihood of a fraudulent transaction is reduced.

Any suitable response to a suitable challenge may be provided. For example, an identification number of the user computing device 110 or a personal identification number from the user 101.

In block 240, if the wallet account on the payment processing system 140 functions as a proxy account, then the payment processing system 140 may initiate a second transaction with an issuer of the selected backing account to fund the merchant transaction. The payment processing system 140 may transmit an approval or refusal of the transaction to the merchant system 130, based on approval or refusal of the transaction with the selected backing account. If the payment processing system 140 is the issuer of the payment account, the payment processing system 140 authorizes the transactions, if all conditions are met and the challenge response is accepted.

The payment processing system 140 approves transaction based on transaction details and challenge response. If the challenge response is accepted and the transaction is approved, then the payment processing system 140 transmits the approval to the POS terminal 134. For the transaction to be approved, the payment processing system 140 determines if certain configurable conditions are met, such as determining if the account is active, if the funds available must be lower than the amount of funds requested in the authorization requested, if certain fraudulent transaction conditions are not met, or any other suitable determinations. The merchant system 130 receives the approval, provides the purchased product or service to the user 101, and logs the transaction.

The transaction funds are remitted to the merchant system 130 from the payment processing system 140. The funds may be transmitted at a later time upon settlement of the transaction.

In certain embodiments, the transaction is an online transaction. In an example, the challenge response is included in the discretionary data field of the account identifier that is provided to a merchant server 135 in the online transaction. The challenge request and the challenge response may utilize any of the techniques described herein in a manner consistent with an online transaction.

Example Systems

Figure 5:
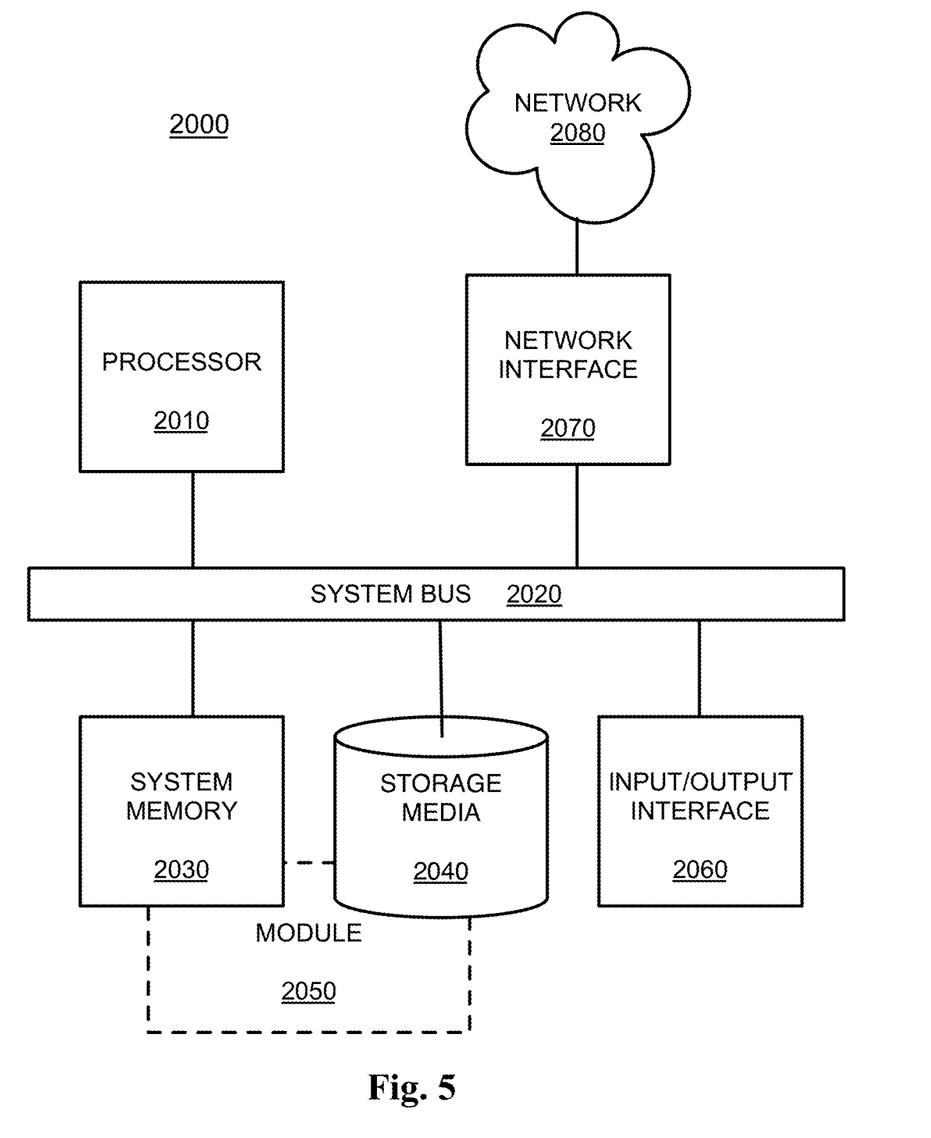
FIG. 5 is a block diagram depicting a computing machine and a module, in accordance with certain example embodiments.

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to use discretionary data fields to secure transactions, comprising:
    storing, by one or more computing devices, a payment account identifier that identifies a payment account associated with an account of a user that is issued by a payment processing system, the payment account identifier identifying the payment account and being arranged in a plurality of fields and comprising a discretionary data field;
    receiving, by the one or more computing devices, a payment request in a communication from a merchant computing system, the payment request comprising a request for payment account information for a payment account to use to fund a payment transaction;
    at a time after receiving the payment request, notifying, by the one or more computing devices, the payment processing system that a transaction is pending, the notifying being in a separate communication from the communication with the merchant computing system;
    receiving, by the one or more computing devices, an authentication challenge from the payment processing system, the authentication challenge being communicated from the payment processing system upon receipt of the notification;
    obtaining, by the one or more computing devices, the payment account identifier and a challenge response to the authentication challenge;
    embedding, by the one or more computing devices, the challenge response in the discretionary data field associated with the payment account identifier; and
    communicating, by the one or more computing devices, the payment account identifier including the discretionary data field having embedded therein the challenge response to the merchant computing system to be communicated from the merchant computing system to the payment processing system to authorize the payment transaction based on a match between the challenge response and a challenge response stored on the payment processing system.

2. The computer-implemented method of claim 1, wherein the receiving of the authentication challenge comprises identifying, by the one or more computing devices, the authentication challenge request stored on the one or more computing devices.

3. The computer-implemented method of claim 2, wherein the challenge request stored on the one or more computing devices is provided by the payment processing system at a time before the receiving of the payment request.

4. The computer-implemented method of claim 1, wherein the challenge response is received as an input for an operator interface associated with a user computing device.

5. The computer-implemented method of claim 1, wherein the challenge response is received from a set of stored data on a user computing device.

6. The computer-implemented method of claim 1, wherein the challenge response comprises location data of the one or more computing devices.

7. The computer-implemented method of claim 1, wherein the challenge response comprises stored transaction data from a previous transaction.

8. A computer program product, comprising:
    a non-transitory computer-readable storage device having computer-executable program instructions embodied thereon that when executed by a computer cause the computer to use discretionary data fields to secure transactions, the computer-executable program instructions comprising:
    computer-executable program instructions to associate a payment account identifier that identifies a payment account associated with a user computing device, the payment account comprising a payment account identifier that identifies the payment account, the payment account identifier being arranged in a plurality of fields and comprising a discretionary data field;
    computer-executable program instructions to receive a communication from the user computing device that a transaction is being initiated;
    computer-executable program instructions to communicate an authentication challenge and a corresponding challenge response to the user computing device upon receiving the communication from the user computing device that the transaction is being initiated;

computer-executable program instructions to receive a first payment authorization request originating from a merchant computing system, the first payment authorization request comprising the payment account identifier including the discretionary data field having embedded therein the challenge response and a request to fund a transaction using the payment account; computer-executable program instructions to compare the received challenge response with the corresponding challenge response; and computer-executable program instructions to reply to the merchant computing system with a responsive authorization state, wherein the responsive authorization state is determined based on the determination whether the provided challenge response and the corresponding challenge response match.

9. The computer program product of claim 8, further comprising:

computer-executable program instructions to receive a request for an authentication challenge from a user computing device to be associated with a pending transaction; and computer-executable program instructions to transmit the challenge request to the user computing device.

10. The computer program product of claim 8, further comprising computer-executable program instructions to access a previous transaction associated with the payment account to determine the corresponding challenge response.

11. The computer program product of claim 8, further comprising:

computer-executable program instructions to receive a location of the user computing device as the provided challenge response;

computer-executable program instructions to access a database of merchant locations; and computer-executable program instructions to determine if the provided location of the user computing device matches an expected location based on an identity of the merchant in the transaction details.

12. The computer program product of claim 8, wherein the authentication challenge is provided to the user computing device at a time before the transaction is initiated.

13. The computer program product of claim 8, further comprising computer-executable program instructions to configure the corresponding challenge response to an authentication question based on an input from a user.

14. A system to select payment accounts to use discretionary data fields to secure transactions, comprising:

a storage resource; and a processor communicatively coupled to the storage resource, wherein the processor executes application code instructions that are stored in the storage resource to cause the system to:

associate a payment account identifier that identifies a payment account associated with a user computing device, the payment account comprising a payment account identifier that identifies the payment account, the payment account identifier being arranged in a plurality of fields and comprising a discretionary data field;

receive a communication from the user computing device that a transaction is being initiated;

communicate an authentication challenge and a corresponding challenge response to the user computing device upon receiving the communication from the user computing device that the transaction is being initiated;

receive a first payment authorization request originating from a merchant computing system, the first payment authorization request comprising the payment account identifier including the discretionary data field having embedded therein the challenge response and a request to fund a transaction using the payment account;

compare the received challenge response with the corresponding challenge response; and reply to the merchant computing system with a responsive authorization state, wherein the responsive authorization state is determined based on the determination whether the provided challenge response and the corresponding challenge response match.

15. The system of claim 14, the processor executing further application code instructions that are stored in the storage device and that cause the system to access a previous transaction associated with the payment account to determine the corresponding challenge response.

16. The system of claim 14, wherein the authentication challenge is provided to the user computing device at a time before the transaction is initiated.

17. The system of claim 14, the processor executing further application code instructions that are stored in the storage device and that cause the system to configure the corresponding challenge response to an authentication question based on an input from a user.

18. The system of claim 14, wherein the challenge response comprises location data of the one or more computing devices.

* * * * *